US007779945B2

(12) United States Patent
Allgäuer

(10) Patent No.: US 7,779,945 B2
(45) Date of Patent: Aug. 24, 2010

(54) METHOD FOR THE PRODUCTION OF A STEERING SPINDLE PART AND STEERING SPINDLE WITH SUCH STEERING SPINDLE PART

(75) Inventor: Rene Allgäuer, Altach (AT)

(73) Assignee: Thyssenkrupp Presta Aktiengesellschaft, Eschen (LI)

( * ) Notice: Subject to any disclaimer, the term of this patent is extended or adjusted under 35 U.S.C. 154(b) by 0 days.

(21) Appl. No.: 12/230,563

(22) Filed: Sep. 2, 2008

(65) Prior Publication Data

US 2009/0051153 A1 Feb. 26, 2009

Related U.S. Application Data

(63) Continuation of application No. PCT/AT2007/000083, filed on Feb. 15, 2007.

(30) Foreign Application Priority Data

Mar. 2, 2006 (DE) ...................... 10 2006 010 228

(51) Int. Cl.
*B62D 1/18* (2006.01)

(52) U.S. Cl. .......................... 180/78; 280/777; 74/492; 464/183; 29/506; 29/508; 29/516

(58) Field of Classification Search .................. 74/492, 74/493; 180/78; 280/771, 778, 93.51, 93.511, 280/777; 29/506–516; 464/183
See application file for complete search history.

(56) References Cited

U.S. PATENT DOCUMENTS 2,926,029 A * 2/1960 St Clair et al. ............. 285/256
4,238,539 A * 12/1980 Yates et al. ................ 428/35.9
4,304,147 A * 12/1981 Linnemeier et al. ........... 74/492
4,469,356 A * 9/1984 Duret et al. ................ 285/332
4,482,174 A * 11/1984 Puri ........................ 285/382.2
4,572,022 A 2/1986 Mettler (Continued)

FOREIGN PATENT DOCUMENTS

DE 25 45 927 4/1977

(Continued)

OTHER PUBLICATIONS

International Search Report issued May 16, 2007 in parent International (PCT) Application PCT/AT2007/000083.

*Primary Examiner*—Paul N Dickson
*Assistant Examiner*—James English
(74) *Attorney, Agent, or Firm*—Wenderoth, Lind & Ponack, L.L.P.

(57) ABSTRACT

A method for the production of a steering spindle part is provided. The method includes forming a section of a steering spindle for a motor vehicle and which is implemented in the form of a hollow shaft and includes at least a connection section adjoining one of its ends. The connection section has at least over a portion of its length a wall thickness (D) which, compared to a section of the steering spindle part adjoining the connection section, is increased, for the production of the steering spindle part as the starting produce is utilized an initially hollow-cylindrical tube, which is at least section-wise reshaped. For the formation of the connection section, a sleeve is set into an end section of the tube and the end section of the tube and of sleeve are subsequently jointly reshaped.

11 Claims, 3 Drawing Sheets

U.S. PATENT DOCUMENTS

| | | | | |
|---|---|---|---|---|
| 4,819,961 | A * | 4/1989 | Henigue | 280/775 |
| 4,938,094 | A * | 7/1990 | Cochard | 74/552 |
| 5,230,661 | A * | 7/1993 | Schreiber et al. | 464/181 |
| 5,937,500 | A * | 8/1999 | Bobbitt, III | 29/516 |
| 6,484,384 | B1 * | 11/2002 | Gibson et al. | 29/516 |
| 7,497,470 | B2 * | 3/2009 | Streng et al. | 280/777 |
| 2001/0004794 | A1 * | 6/2001 | Kumar | 29/505 |
| 2003/0154815 | A1 * | 8/2003 | Heiml | 74/492 |
| 2004/0034981 | A1 * | 2/2004 | Harms et al. | 29/421.1 |
| 2004/0118239 | A1 * | 6/2004 | Kittler et al. | 74/492 |
| 2004/0177715 | A1 * | 9/2004 | Kittler et al. | 74/492 |
| 2005/0194775 | A1 | 9/2005 | Bastein et al. | |

FOREIGN PATENT DOCUMENTS

| | | |
|---|---|---|
| DE | 197 50 005 | 4/1999 |
| DE | 103 47 101 | 5/2005 |
| DE | 10 2004 009 188 | 9/2005 |
| EP | 0 024 986 | 3/1981 |
| EP | 1 138 575 | 12/2005 |
| FR | 2 473 975 | 7/1981 |
| FR | 2 508 860 | 1/1983 |

* cited by examiner

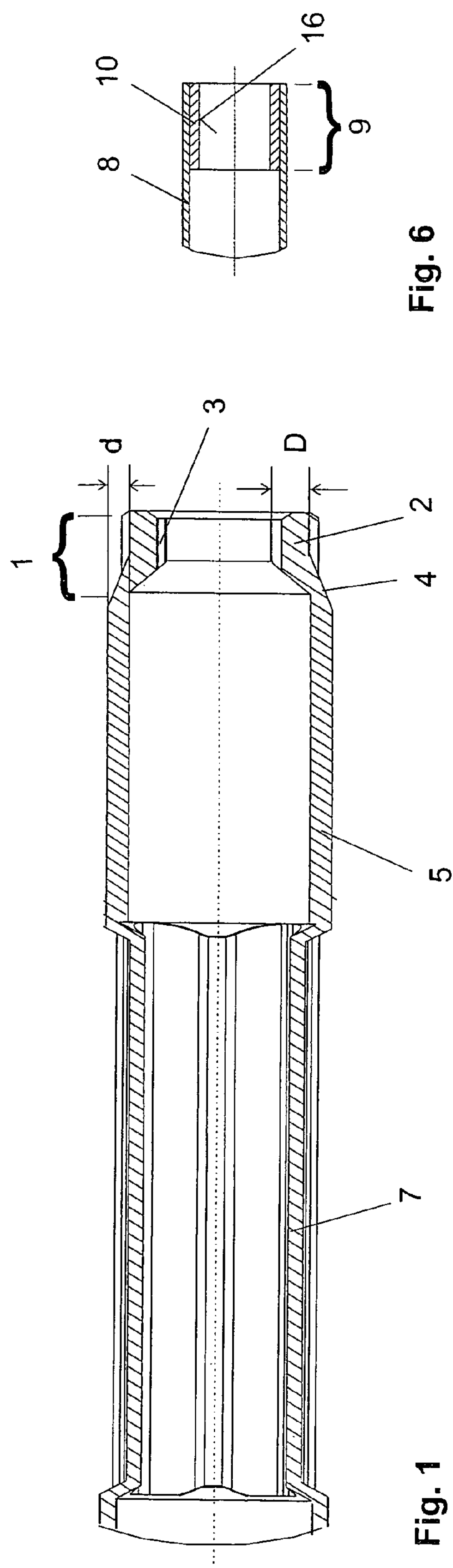
Fig. 6
Fig. 1
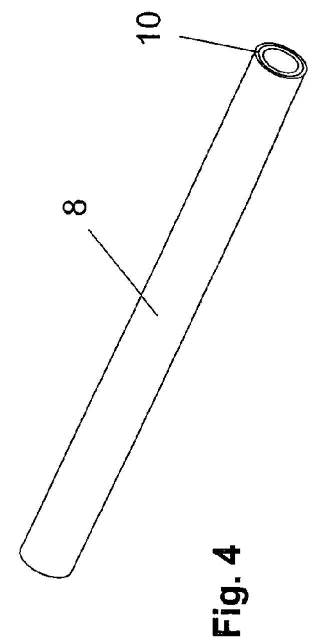
Fig. 4
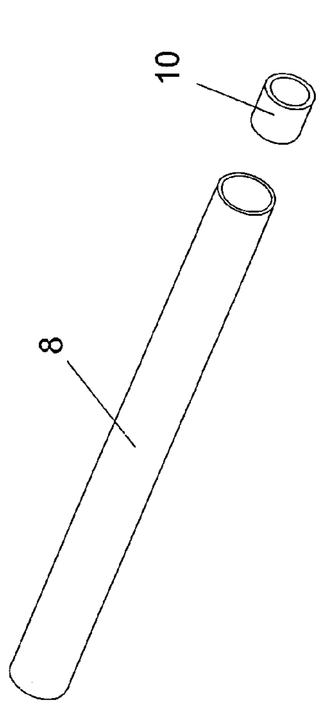
Fig. 2
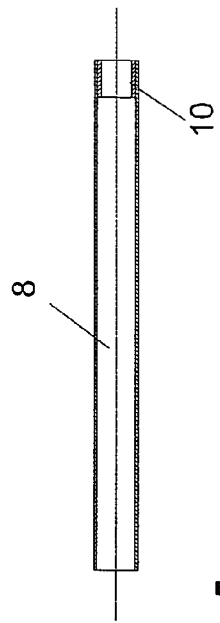
Fig. 5
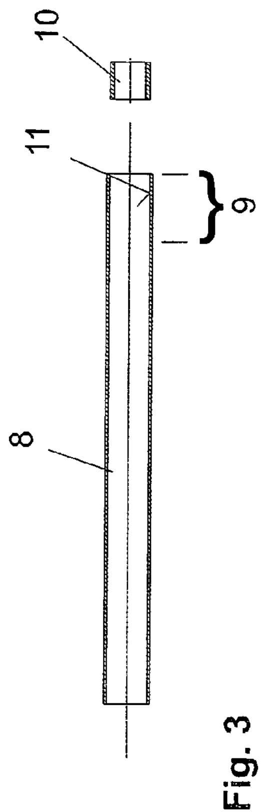
Fig. 3

METHOD FOR THE PRODUCTION OF A STEERING SPINDLE PART AND STEERING SPINDLE WITH SUCH STEERING SPINDLE PART

This is a continuation of International application serial number PCT/AT2007/000083, filed Feb. 15, 2007, the entire disclosure of which is incorporated herein by reference.

BACKGROUND OF THE INVENTION a) Field of the Invention

The invention relates to a method for the production of a steering spindle part, which forms a section of a steering spindle for a motor vehicle and is implemented in the form of a hollow shaft. The steering spindle part comprises, at least adjoining one of its ends, a connection section having at least over a portion of its length a greater wall thickness compared to a section of the steering spindle part adjoining the connection section. For the production of the steering spindle part, an initially hollow-cylindrical tube which, at least section-wise, is reshaped is utilized as the starting product. The invention further relates to a steering spindle for a motor vehicle with at least one steering spindle part forming a section of a steering spindle for a motor vehicle and implemented in the form of a hollow shaft and which, adjoining at least one of its ends, comprises a connection section which, at least over a portion of its length, has a greater wall thickness compared to a section of the steering spindle part adjoining the connection section, wherein the steering spindle part includes a tube extending over its length.

b) Description of Related Prior Art

Steering spindles of motor vehicles conventionally comprise several steering spindle parts, each of which forms a section of the steering spindle. The steering wheel is secured in place on the rear end of the steering spindle section, which with respect to the traveling direction is the rearmost. On the steering spindle section, which with respect to the traveling direction is the foremost, a pinion gear is frequently secured on its front end for the meshing into the steering gearing. Apart from steering spindle parts connected with one another via universal joints, steering spindle parts displaceable (telescopable) with respect to one another are provided, which serve for the purpose of setting the length of the steering column and/or for absorbing longitudinal displacements in the event of a crash.

The connection of the steering wheel with the rearmost steering spindle part in a known embodiment takes place by means of a threaded joint. The steering spindle part implemented in the form of a hollow shaft exhibits for this purpose at its end a connection section which, starting from the end of the steering spindle part, comprises a substantially hollow-cylindrical section and adjoining the latter a conical section which widens toward the middle of the steering spindle part. The hollow-cylindrical section is provided with inner threading and outer toothing. The outer toothing meshes into an inner toothing of the hub of the steering wheel and the threaded joint of the steering wheel on the steering spindle part is accomplished by means of the inner threading. The steering spindle part must herein have a wall thickness of adequate size in the connection section, in particular in the hollow-cylindrical end section. This wall thickness is greater than the wall thickness required for the transfer of the torque over the remaining length of the steering spindle part. For the implementation of the steering spindle parts therefore tubes are conventionally utilized which initially have a greater wall thickness, apart from the connection section, than is required. Subsequently working, in particular hammering or a like reshaping method, for example ductile-working, of the tube over its entire longitudinal dimension takes place. In the connection section the diameter of the tube is decreased herein. Furthermore, structures can also be worked over sections into the tube, which structures serve, for example, for the telescopable, yet nonrotatable, connection with a further steering spindle part. The implementation of such contours, in particular in the form of arcuate toothings or cloverleaf profiles, is known. DE 197 50 005 C1, for example, shows steering spindle parts with such contours.

Due to the required reshaping of the tube over its entire length, this process is highly labor-intensive and also difficult to control.

While it is possible to increase the wall thickness of a tube by hammeringdue to the factors imitating such thickening, a tube must nevertheless be employed as the starting product which has a greater wall thickness than would be necessary for the required torque transfer. The steering spindle part becomes thereby overall heavy or the tube must again be worked over its entire length in order to appropriately decrease the wall thickness, apart from the connection section.

DE 10 2004 009 188 A1 discloses two telescopably connected steering spindle parts which, viewed in longitudinal section, have complicated contours with different thickness regions of their wall thicknesses. At their remote ends, connection sections are provided for the connection with a steering wheel or a steering gearing, respectively.

Securing a steering wheel on a steering shaft by means of a bolt disposed transversely to the axis of the steering spindle, which bolt cooperates with a holding cone and shifts it into a recess of the steering wheel hub and tightens it against the steering shaft, is disclosed in EP 1 138 575 B1. The steering spindle part, on the end of which the steering wheel is secured, is here solid, however, it could also be formed as a hollow shaft with a sufficiently great wall thickness.

A further securement of a steering wheel at the end of the steering spindle part adjoining the steering wheel is disclosed in U.S. Pat. No. 4,819,961 A. The steering spindle part formed as a hollow shaft exhibits at its end a connection section in which the tube of the steering spindle part initially conically tapers toward its end and adjoining thereon comprises a hollow-cylindrical section with an inner toothing. In the connection section is disposed a clamping piece, whose outer contour corresponds to the inner contour of the tube and which projects from the tube at its end. It comprises first and second outer toothings, which, on the one hand, cooperate with the inner toothing of the tube and, on the other hand, with an inner toothing of the steering wheel hub. It exhibits, furthermore, an inner threading, into which a bolt is screwed engaging on the steering wheel hub in order to tighten the parts with one another. Through the solid clamping piece set into the connection section the wall thickness of the steering spindle part can be constant over its length. In such a clamping connection there is the risk that the applied clamping forces decrease over time whereby undesirable play may develop. The clamping piece must furthermore be inserted through the steering spindle part from the side remote from the steering wheel. Consequently, the steering spindle part must not have any regions with decreased cross section, for example in order to implement a telescopable torque-transferring connection with a further steering spindle part. The clamping piece, moreover, can slide into the interior of the steering spindle part when the steering wheel is removed, which consequently makes it inaccessible.

A steering spindle part according to the prior art will first be explained with reference to FIG. 1. This part is the rearmost, in reference to the traveling direction, steering spindle part of a steering spindle for a motor vehicle, on the end of which a steering wheel is to be attached. The steering spindle part comprises for this purpose a connection section 1 at the end facing the steering wheel. Starting from the end of the steering spindle part, this connection section 1 includes a hollow-cylindrical section 2 in which are formed an inner threading 3 and an outer toothing 6, and adjoining thereon toward the middle of the steering spindle part a conically widening section 4. In particular in the hollow-cylindrical section 2 the wall thickness D is greater than the wall thickness d in a section 5 adjoining the connection section 1 of the steering spindle part.

For the connection of the (not shown) steering wheel with the steering spindle part, the steering wheel is slid onto the connection section 1, wherein it comes to lie in contact with a conical inner wall on the conical section 4 and meshes with an inner toothing into the outer toothing 6. Furthermore, by means of a bolt threaded into the inner threading 3, the steering wheel is screwed down with the steering spindle part.

On the side remote from the connection section 1, the steering spindle part comprises a section 7 in which it is provided with a contour differing from a circular arc in order to form a connection, displaceable (telescopable) in the longitudinal direction of the steering spindle part, yet torque transferring, with a further steering spindle part. The section 7 can be formed in particular with a circumferential arcuate toothing or a cloverleaf profile.

For the production of this steering spindle part a tube is utilized as the starting product, which has a diameter and a wall thickness in the region of the section 5 which corresponds to the wall thickness D in the connection section 1. This initial wall thickness is at least greater than the wall thickness d in section 5, which is still adequate for the transfer of the torque since otherwise in connection section 1 a sufficient wall thickness cannot be formed. This tube is consequently worked using reshaping processes for the production of the steering spindle section, in particular by hammering and/or ductile-working, over its entire longitudinal dimension. If the tube in sections 5 and 7 were to be left in its original wall thickness, it would lead to a considerably increased requirement of material and accordingly to a large weight of the steering spindle part.

SUMMARY OF THE INVENTION

The invention addresses the problem of providing a method of the type described in the introduction for the implementation of a connection section of a steering spindle part, which method can be carried out simply and cost effectively, or of providing a steering spindle, respectively with at least one steering spindle part comprising at least one connection section, which part can be produced simply and cost effectively.

This is attained according to the invention in a method in which, for the formation of the connection section, into one end section of the tube a sleeve is set and subsequently the end section of the tube and the sleeve together are reshaped, wherein creeping of the material of the tube and of the sleeve takes place.

In a steering spindle according to the present invention in the connection section of the steering spindle part within the tube, a sleeve is disposed resting in contact on the inner wall of the tube and rigidly connected with it at least by force closure.

In the method according to the invention or in a steering spindle according to the invention, a commercially available hollow-cylindrical tube can be drawn on as the starting product for the production of the steering spindle part. Into an end section of this tube is set, in particular pressed, a sleeve for the formation of the connection section. The end section of the tube and the sleeve are subsequently reshaped jointly, preferably by hammering and/or ductile-working. The end contour of the connection section is developed and simultaneously a sufficiently strong connection is obtained between the tube and the sleeve. Through the joint reshaping of the end section of the tube and of the sleeve, a strong force-closure connection can be attained between the tube and the sleeve. After the sleeve has been set into, preferably pressed into, the tube, a friction closure (force closure) already available can thereby be further reinforced. Furthermore, during this reshaping a form closure, acting against the sleeve being pulled out from the end of the tube, can advantageously be developed between the tube and the sleeve.

Into the contour of the connection section developed in this manner the desired further connection elements can be introduced, for example an inner threading on the inner wall of the sleeve and/or a special circumferential contour, such as for example a triangle, hexagon or octagon or a toothing. Such a contour is, for example, developed for the formation of a good connection with a corresponding inner contour of a hub of a steering wheel or a fork for a universal joint or of a steering pinion gear.

The wall thickness of the hollow-cylindrical tube utilized as the starting product can be such that just an adequate rigidity of the steering spindle part, in particular for the required transfer of the torque, is obtained. Reshaping working of the tube over its entire length, in order to attain the desired thinner wall thickness remote from the connection section, is consequently not required. Through the sleeve set into the end section of the tube, a sufficiently great wall thickness is attained in the connection section.

After or before or also in the same operating step—or in the same mounting of the starting tube—of the reshaping in the connection section, over further sections of the tube, in which geometries different from the original hollow-cylindrical shape can be required, appropriate material reshaping steps can be carried out, for example for the formation of circumferential arcuate toothings or cloverleaf profiles in order to develop a displaceable, yet torque transferring, connection with a further steering spindle part.

Apart from hammering and ductile-working, for the reshaping of the steering spindle part in the connection section, other reshaping methods can also be employed, in particular other types of compressive deformation, for example rolling, can also be utilized.

Further advantages and details of the invention will be discussed in the following description in conjunction with the enclosed drawings.

BRIEF DESCRIPTION OF THE DRAWINGS

In the drawings:

FIG. 1 shows a steering spindle part according to prior art in longitudinal section, FIG. 2 shows a three-dimensional representation of a hollow-cylindrical tube and of a sleeve as the starting products for a steering spindle part according to the invention, FIG. 3 shows a longitudinal section through the tube and the sleeve, FIG. 4 shows a three-dimensional representation after the sleeve has been set into the tube, FIG. 5 shows a longitudinal section at this fabrication stage, FIG. 6 shows an enlarged segment from FIG. 5.

DETAILED DESCRIPTION OF THE PREFERRED EMBODIMENTS

Figure 7:
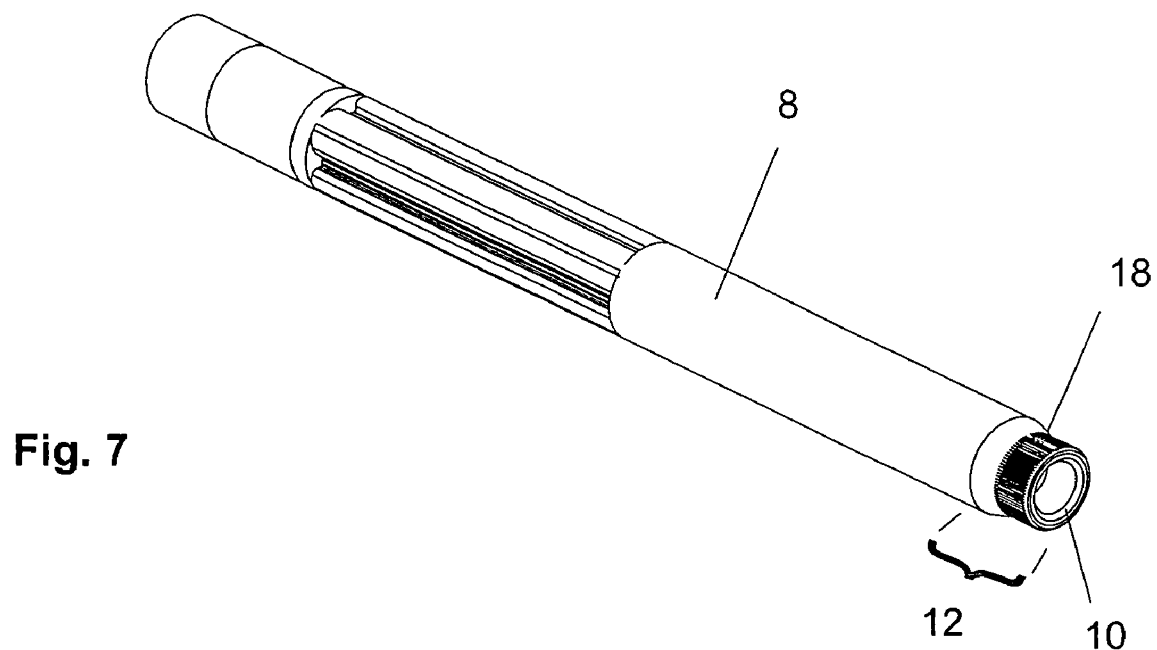
FIG. 7 shows a three-dimensional representation of the finished steering spindle part according to the invention.
Figure 9:
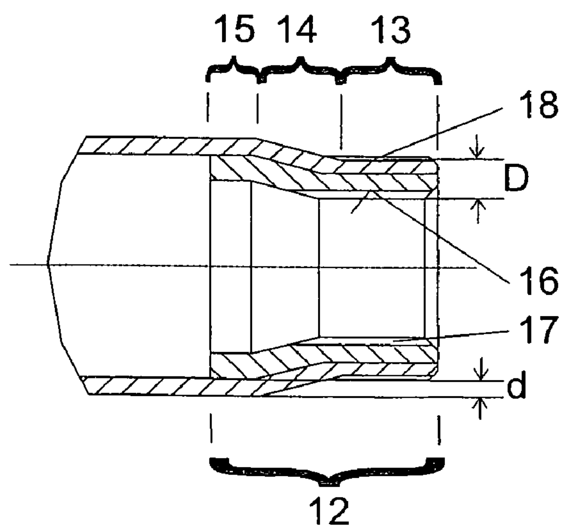
FIG. 9 shows an enlarged segment from FIG. 8.
Figure 8:
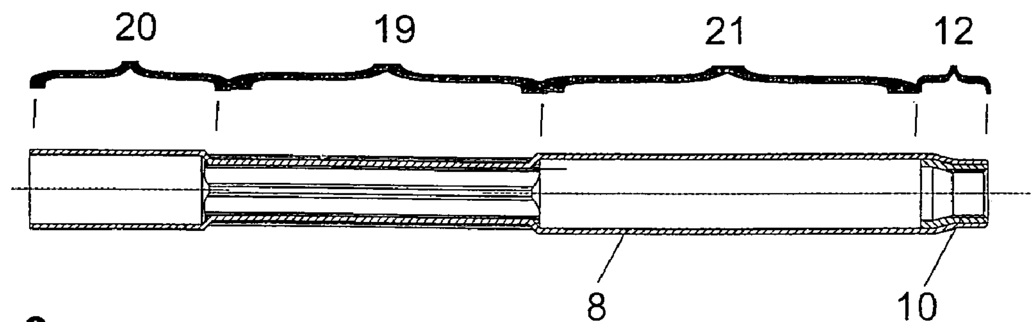
FIG. 8 shows a longitudinal section through this finished steering spindle part.

An embodiment of the implementation of a steering spindle part according to the invention will be described in the following in conjunction with FIGS. 2 to 9.

As the starting product for the steering spindle part to be implemented in the form of a hollow shaft, which forms a section of the longitudinal extent of a steering column for a motor vehicle, a hollow-cylindrical tube 8 is utilized, i.e. the tube 8 has over its entire longitudinal extent a uniform wall thickness. The wall thickness of tube 8 is only as great as is required for the overall rigidity of the steering spindle part, in particular for the transfer of the occurring torques.

Into an end section 9 of tube 8, which section continues to have the original hollow-cylindrical form, a sleeve 10, also of hollow cylindrical form, is set. The sleeve 10 with its outer wall comes to rest circumferentially in contact on the inner wall 11 of the tube 8 when it is set into the end section of tube 8. In order to attain seating under frictional closure of sleeve 10 in end section 9 of tube 8 facilitating the subsequent working, the sleeve 10 is pressed into the end section 9 of tube 8 providing frictional closure. After they have been set into tube 8, the end of tube 8 and the end of sleeve 10 are preferably flush with respect to one another. The steering spindle part to be produced is depicted at this fabrication state in FIGS. 4 to 6.

To implement the connection section 12 of the steering spindle part, the end section 9 of the tube and the sleeve 10 are subsequently reshaped jointly, for example by manual forging reshaping, preferably by hammering. The reshaping energy is consequently supplied by the kinetic energy of an impact. This is also referred to as "dynamic forging". The end section 9 of tube 8 and the sleeve 10 can herein be heated, or hammering can be carried out without such heating.

Instead of, or in addition to, such hammering, compressive deformation of the end section 9 of tube 8 and the sleeve 10 can also be carried out by ductile-working. Instead of, or in addition to, the referred compressive deformation methods, other types of compressive deformation, for example rolling, can also be employed.

In a further alternative, or also in combination with one or several of the methods already stated, the connection section 12 can also be reshaped by pressing with two or more die parts. Such die parts are supplied from the outside onto the outer circumference of the connection section 12 and therein press the tube 8 with the sleeve 10 situated in it into the desired shape. Herein also non-encircling groovings can in a very simple manner be introduced into the connection section 12.

In the joint reshaping of end section 9 of tube 8 and of sleeve 10, their outer and inner diameters are decreased at least over a section of their common longitudinal extent. In the depicted embodiment, starting from the end of the tube, first, a hollow-cylindrical section 13 and adjoining it toward the tube middle a conical section 14 is formed, which tapers toward the adjacent end of tube 8. In the depicted embodiment adjoining the conical section 14 is again a hollow-cylindrical section 15, in which the outer and inner diameter of tube 8 and of sleeve 10 have their original value (here after the sleeve 10 was pressed in, no reshaping material working was carried out). In the conical section 14 and end-side hollow-cylindrical section 13 the inner and outer diameters of tube 8 and of sleeve 10 are decreased, in comparison to their original value. The hollow-cylindrical section 15 could also be omitted.

Due to the creeping of the material of tube 8 and of sleeve 10 taking place in the reshaping, their force-closure connection is reinforced. Furthermore, in the formation of the connection section 12 according to the depicted embodiment, a form closure is formed between tube 8 and sleeve 10 acting against the sleeve 10 being pulled out of that end of tube 8 at which the sleeve 10 is disposed, as is preferred. The form closure is formed in the embodiment example through the conical section 14.

In a section adjoining the end of the steering spindle part, which section extends in the depicted embodiment minimally further than the hollow-cylindrical section 13, the inner wall 16 of the sleeve 10, after the joint reshaping of the end section 9 of the tube 8 and of the sleeve 10, is formed as a cylindrical shell. Into this cylindrical shell-form inner wall 16 of sleeve 10 subsequently an inner threading 17 is introduced. Further, the outer wall of sleeve 10 in the region of hollow-cylindrical section 13 is provided with an outer toothing 18, whose tooth combs extend in the longitudinal direction of the steering spindle part. The finished connection section 12 is evident in FIGS. 7 to 9.

The steering spindle part 1 is furthermore provided over a section 19 of its longitudinal extent with a profile differing from a circular form, which profile is here developed in the form of a circumferential arcuate toothing or a cloverleaf profile. A further steering spindle part provided with a corresponding profile can be accepted into the steering spindle part and is connected with the section 19 such that it is displaceable in the longitudinal direction yet is secured under form closure against a turning out of position. Deformation of the tube 8 in section 19 can be carried out before or after the joint deformation of the end section 9 of tube 8 and of sleeve 10.

In further sections 20, 21 of its longitudinal extent the steering spindle part is formed by the tube 8 in its original form. Tube 8 must consequently be worked using reshaping processes only over portions of its longitudinal extent.

In connection section 12, the overall wall thickness D of the steering spindle part is greater than the wall thickness d in a main section 21 adjoining the connection section 12.

Figure 10:
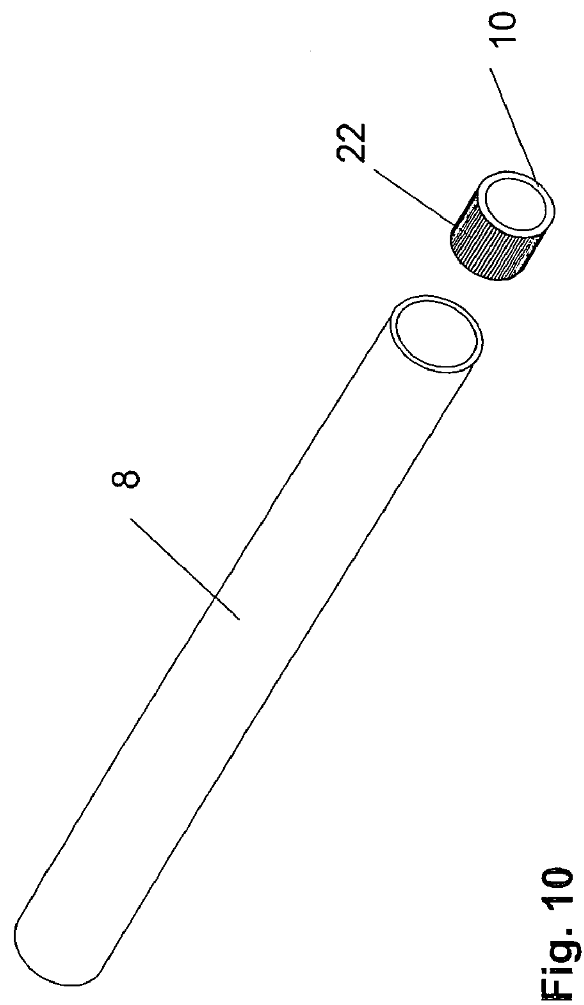
FIG. 10 shows a tube and a sleeve as starting products for a steering spindle part according to the invention in accordance with a minimally modified embodiment of the invention.

In the embodiment depicted in FIG. 10, the sleeve 10 is provided on its outside with a rough surface such as knurling 22 or teeth extending along a longitudinal axis of the sleeve 10 and spaced around a circumference of the sleeve 10 before it is pressed into the end section 9 of tube 8. While the sleeve 10 is pressed in, groovings are formed on the inner wall of tube 8 in end section 9 whereby a form closure (joint) acting against turning out of position is attained (i.e., the joint restricts rotation between the sleeve 10 and the tube 8).

The material thickness (wall thickness) and length of sleeve 10 can be selected for the entire wall thickness and/or length of the connection section 12 depending on requirements.

Figure 11:
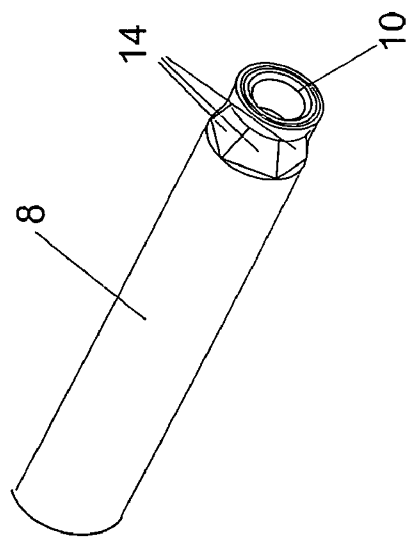
FIG. 11 shows a three-dimensional representation of a further embodiment of the finished steering spindle part according to the invention.

Various further modifications of the depicted embodiments of the invention are conceivable and feasible without leaving the scope of the invention. For example, in the connection section 12, connection elements other than the inner threading 17 of sleeve 10 and the outer toothing 18 of tube 8 can be introduced. The toothing could, for example, also be introduced on the inner wall 16 of sleeve 10 and the threading on the outer wall of tube 8. Instead of a toothing, a polygonal contour, for example a hexagon, could also be utilized. The toothing and/or polygonal contour could also be disposed in a conical section or they could extend over such. An example of such an alternative embodiment is shown in FIG. 11. In this example, on the outer circumferential contour a hexagonal cross section is formed, and the cross section tapers continuously over a cone section 14 toward the end of the steering spindle. Threads are implemented in the interior.

Instead of simple polygonal cross sectional contours, cross sectional contours corresponding to arcuate polygons can also be formed on the corresponding portion of the connection section 12.

Alternatively, embodiments of the connection section 12 are also conceivable and feasible, in which no threadings at all are formed either on the outside or on the inside. On the outer wall, functional encircling or non-encircling groovings can also be provided as appropriate connection elements. The connection section can herein even be reshaped so far that, at least in a portion of its longitudinal extent, it is no longer hollow in the interior, that is the inner diameter of the sleeve is decreased down to zero or at least down to nearly zero.

Although the connection section 12 of the steering spindle part has been described within the context of a steering wheel securement, a connection section according to the invention could also be utilized for the connection between the steering spindle part and other parts of the steering spindle, for example for the securement of the fork of a universal joint.

LEGEND OF THE REFERENCE NUMBERS

1 Connection section
2 Hollow-cylindrical section
3 Inner threading
4 Conical section
5 Section
6 Outer toothing
7 Section
8 Tube
9 End section
10 Sleeve
11 Inner wall
12 Connection section
13 Hollow-cylindrical section
14 Conical section
15 Hollow-cylindrical section
16 Inner wall
17 Inner threading
18 Outer toothing
19 Section
20 Section
21 Section
22 Knurling

The invention claimed is:

1. A method for the production of a steering spindle part which forms a portion of a steering spindle to be used in a motor vehicle, said method comprising:

providing a hollow cylindrical tube;

forming a sleeve by applying a rough outer surface to the sleeve, the rough outer surface comprising teeth spaced around an outer circumference of the sleeve, each of the teeth extending along a longitudinal axis of the sleeve; and forming a connection section at an end of the hollow cylindrical tube, at least a portion of a length of the connection section having a wall thickness larger than a wall thickness of an adjoining main section of the hollow cylindrical tube, said forming the connection section including:

applying the sleeve to an end section of the hollow cylindrical tube by pressing the sleeve into the end section of the hollow cylindrical tube such that the teeth of the rough outer surface form longitudinal grooves on an inner surface of the hollow cylindrical tube so as to create a joint configured to restrict rotation of the sleeve relative to the hollow cylindrical tube; and after said applying of the sleeve, jointly reshaping the end section of the hollow cylindrical tube and the sleeve such that creeping of a material of the hollow cylindrical tube and creeping of a material of the sleeve occurs; and applying an inner thread onto an inner wall surface of the connection section.

2. The method of claim 1, wherein said jointly reshaping of the end section of the hollow cylindrical tube and of the sleeve comprises decreasing an outer diameter and an inner diameter of the hollow cylindrical tube and the sleeve at least over an entirety of length of the sleeve applied to the end section.

3. The method of claim 1, wherein said jointly reshaping of the end section of the hollow cylindrical tube and of the sleeve comprises forming a form closure between the hollow cylindrical tube and the sleeve, the form closure formed so as to act against the sleeve being pulled off from the end section of the hollow cylindrical tube.

4. The method of claim 1, wherein after said jointly reshaping of the end section of the hollow cylindrical tube and of the sleeve, an inner wall of the sleeve is formed as a cylindrical shell at least in a section adjoining the end section of the hollow cylindrical tube.

5. The method of claim 1, wherein said jointly reshaping of the end section of the hollow cylindrical tube and of the sleeve comprises compressive deformation.

6. The method of claim 5, wherein said compressive deformation comprises hammering.

7. The method of claim 5, wherein said compressive deformation comprises ductile-working.

8. The method of claim 1, wherein said jointly reshaping of the end section of the hollow cylindrical tube and of the sleeve comprises forming a conical section tapering toward the adjoining main section of the hollow cylindrical tube, and comprises forming a hollow-cylindrical section located closer to the end of the hollow cylindrical tube than is the conical section.

9. The method of claim 8, wherein, after said jointly reshaping of the end section of the hollow cylindrical tube and of the sleeve, applying outer teeth to the hollow cylindrical tube in a region of the hollow cylindrical section.

10. The method of claim 1, further comprising applying a non-circular profile to a portion of the adjoining main section of the hollow cylindrical tube, said non-circular profile comprising one of circumferential arcuate teeth and a cloverleaf shape.

11. The method of claim 1, wherein said jointly reshaping of the end section of the hollow cylindrical tube and of the sleeve comprises forming a conical section tapering toward the adjoining main section of the hollow cylindrical tube, and comprises forming a polygonal contour on an outer surface of the conical section.

* * * * *